United States Patent
Debbou et al.

(10) Patent No.: US 11,664,739 B2
(45) Date of Patent: May 30, 2023

(54) FOUR-ARM NPC CONVERTER FOR ELECTRIC VEHICLES AND TWO-WAY CHARGER COMPRISING SUCH A CONVERTER

(71) Applicant: INSTITUT VEDECOM, Versailles (FR)

(72) Inventors: Mustapha Debbou, Boulogne Billancourt (FR); David Frey, Saint Martin d'Hères (FR); Nisith Bhowmick, Grenoble (FR); François Colet, Bois Colombes (FR); Seddik Bacha, Eybens (FR)

(73) Assignee: INSTITUT VEDECOM, Versailles (FR)

( * ) Notice: Subject to any disclaimer, the term of this patent is extended or adjusted under 35 U.S.C. 154(b) by 304 days.

(21) Appl. No.: 17/043,524

(22) PCT Filed: Mar. 28, 2019

(86) PCT No.: PCT/FR2019/050730
§ 371 (c)(1),
(2) Date: Sep. 29, 2020

(87) PCT Pub. No.: WO2019/186078
PCT Pub. Date: Oct. 3, 2019

(65) Prior Publication Data
US 2021/0111641 A1    Apr. 15, 2021

(30) Foreign Application Priority Data
Mar. 30, 2018 (FR) ...................................... 1852814

(51) Int. Cl.
*H02J 7/00* (2006.01)
*H02M 7/217* (2006.01)
(Continued)

(52) U.S. Cl.
CPC ............. *H02M 7/2173* (2013.01); *H02J 7/02* (2013.01); *H02M 7/219* (2013.01); *B60L 53/62* (2019.02); *B60L 2210/30* (2013.01)

(58) Field of Classification Search
USPC ..... 320/106, 107, 108, 109, 110; 363/17, 37
See application file for complete search history.

(56) References Cited

U.S. PATENT DOCUMENTS

| 2013/0194838 A1* | 8/2013 | Jang ..................... H02M 1/4216 363/37 |
| 2015/0180356 A1* | 6/2015 | Norisada ................. B60L 53/14 363/17 |

(Continued)

FOREIGN PATENT DOCUMENTS

| CN | 1792029 A | * | 6/2006 | ............. H02P 9/006 |
| CN | 201854192 U | * | 6/2011 | |

(Continued)

OTHER PUBLICATIONS

International Search Report for PCT/FR2019/050730 dated May 24, 2019.

(Continued)

*Primary Examiner* — Brian Ngo
(74) *Attorney, Agent, or Firm* — Sandberg Phoenix & von Gontard PC

(57) ABSTRACT

In brief, the invention relates in particular to a converter (100) comprising a plurality of rectifier arms (110), making it possible in particular to rectify AC electrical signals available on the electrical phases (U, V, W) of an electrical grid. To balance the electrical signals coming from the electrical phases (U, V, W) of the electrical grid, and to limit a modulation amplitude of the DC signal generated by the converter (100) between its output terminals (S1, S2), the converter (100) also comprises a correction arm (120) that determines an amplitude of electric current flowing in a neutral (N) of the electrical grid and that generates an opposing electric current of equal or if not close amplitude. The invention also relates to a two-way charger (10) comprising such a converter (100) and one or more active double (Continued)

bridges (200), such that an output (S3, S4) of the active double bridges (200) is electrically isolated from the converter (100).

13 Claims, 2 Drawing Sheets

(51) Int. Cl.
*H02J 7/02* (2016.01)
*H02M 7/219* (2006.01)
*B60L 53/62* (2019.01)

(56) References Cited

U.S. PATENT DOCUMENTS

| | | | |
|---|---|---|---|
| 2017/0047881 A1* | 2/2017 | Shimura | F04B 49/065 |
| 2019/0393822 A1* | 12/2019 | Ganesan | H02P 31/00 |
| 2020/0321857 A1* | 10/2020 | Osako | H02P 27/06 |

FOREIGN PATENT DOCUMENTS

| | | | | |
|---|---|---|---|---|
| CN | 102739100 B | | 9/2014 | |
| CN | 104515917 A | * | 4/2015 | ........... G01R 31/028 |
| EP | 1995860 A2 | | 11/2008 | |
| EP | 2613432 A1 | | 7/2013 | |
| JP | 2002199738 A | | 7/2002 | |
| JP | 2003143865 A | * | 5/2003 | |
| KR | 20200003587 A | * | 7/2018 | |
| WO | 2015094232 A1 | | 6/2015 | |

OTHER PUBLICATIONS

Written Opinion for PCT/FR2019/050730 dated May 24, 2019.
Leuenberger D et al, "Comparison of a Soft Switched TCM T-Type Inverter to Hard Switched Inverters for a 3 Phase PV Grid Interface", 15th International Power Electronics and Motion Control Conference (EPE/PEMC), 2012 , Sep. 4, 2012 (Sep. 4, 2012), p. LS1d.1-1-LSd.1-8, XP032311999; DOI: 10.1109/EPEPEMC.2012. 6397397 external link; ISBN: 9781467319706.

* cited by examiner

FOUR-ARM NPC CONVERTER FOR ELECTRIC VEHICLES AND TWO-WAY CHARGER COMPRISING SUCH A CONVERTER

CROSS-REFERENCE TO RELATED APPLICATIONS

The present application is the US National Stage under 35 USC § 371 of International Application No. PCT/FR2019/050730 filed 28 Mar. 2019 and which claims the priority of the French application 1852814 filed on 30 Mar. 2018, the content (text, drawings, and claims) of both being incorporated herein by reference.

TECHNICAL FIELD

The present invention relates to a power factor correction converter which fulfils the function of a rectifier/inverter as used for example in the field of power electronics. The present invention also relates to a reversible charger comprising a converter of this kind, which is designed to function as a rectifier and, selectively, as an inverter.

STATE OF THE PRIOR ART

In the field of transport, the automotive industry is subject to very strict emissions standards for pollutants, which result in a real technological change in order to reduce, in particular $CO_2$, emissions. These constraints result in designing electric vehicles, the architectures of which may be hybrid or entirely electric.

The ever increasing number of electric vehicles in circulation in vehicle fleets requires the development of safe, ergonomic, and effective charging systems. Charging systems of this kind must be designed taking account of the impact of the huge influx of electric vehicles, in particular with regard to the stability of the electric network.

Furthermore, new electrical charging strategies have been designed in order to take advantage of the growing number of electric vehicles. It is estimated that an automotive vehicle is unused for approximately 95% of its lifetime, and the average use of an electric vehicle will consume less than 80% of the capacity of its battery for day-to-day journeys. One strategy considered thus consists in taking advantage of these periods of non-use of the electric vehicles in order to inject, into the electric network, some of the electrical energy stored in the batteries of the vehicles when the electric vehicles are connected to the electric network.

For this purpose, reversible chargers are known which make it possible, during a phase of charging the electric vehicle, to transfer available electricity on an electric network to the battery of the electric vehicle. This charging phase is comparable to that implemented in the case of well-known unidirectional chargers. In contrast, in a less traditional manner, the reversible chargers also make it possible, during a phase of discharge of the electric vehicle, to transfer electrical energy stored in the batteries of the electric vehicle to the electric network in order to respond to the high demands for electrical energy during consumption peaks or in order to overcome a temporary insufficiency of electrical production by the electric network.

In particular reversible chargers are known that are isolated or not isolated with respect to the electric network to which they are able to be connected. The disadvantage of the known reversible chargers is primarily linked to their lack of flexibility. The known reversible chargers do not respond to a sag on the electric network. They therefore have to be stopped.

SUMMARY

Briefly stated, a new converter is disclosed that overcomes at least a large proportion of the above-mentioned problems and furthermore which leads to other advantages. This new converter makes it possible to optimize bidirectional functionality of a reversible charger which comprises a converter of this kind and is located onboard within an electric vehicle.

Another aim of the converter is that of being able to reduce an imbalance in the electric network by means of one or more electric vehicle(s).

Another aim of the converter is that of reducing the size of a reversible charger of this kind, as well as the manufacturing costs thereof.

According to a first aspect, at least one of the above-mentioned objects is achieved using a converter that is designed to be electrically connected to a plurality of electrical phases of the electric network, the converter comprising:
  a plurality of rectification branches, each rectification branch comprising a rectifier bridge formed by a first switching device and a second switching device, the first and the second switching device being electrically interconnected in the region of a common point that is electrically connected to one of the electrical phases of the electric network, each rectification branch being electrically connected to a different electrical phase; and
  a voltage branch that is positioned so as to bypass all the rectification branches, the voltage branch comprising at least two output capacitors that are positioned in series, a midpoint of the two output capacitors being electrically connected to each switching device of each rectification branch by means of an output line.

The converter according to the first aspect comprises a device for correcting phase differences between the various electrical phases of the electric network, the correction device being designed so as to minimize, and preferably eliminate, an electric current flowing in an electrical reference line of the electric network. In other words, the converter according to the first aspect is designed to correct a power factor of the electrical phases of the electric network.

In a non-limiting manner, the electrical reference line of the electric network is preferably an electrical neutral.

The converter according to the first aspect thus has an architecture of the NPC (Neutral Point Clamped) type.

In the converter according to the first aspect, each rectification branch is designed to ensure rectification of an electrical voltage present on one of the electrical phases of the electric network to which the converter is connected. The converter according to the first aspect preferably comprises three rectification branches and the device for correcting phase differences between the various electrical phases of the electric network. More particularly, the correction device is designed to:
  detect and quantify an electric current flowing on the reference electric line of the electric network;
  minimize, or even eliminate, the electric current by generating an electrical correction current which makes it possible to rebalance the electrical phases at the converter.

The correction device will be described and specified later.

The converter according to the first aspect thus makes it possible to optimize the functioning thereof, by regulating, in an autonomous manner, a possible electrical interphase imbalance and/or electric ripples of the electric network.

The converter according to the first aspect may advantageously comprise at least one of the improvements below, it being possible for the technical features forming the improvements to be taken individually or in combination:

- the correction device is formed by a correction branch of the converter, the correction branch being electrically connected to the electrical reference line of the electric network in the region of an intermediate point, the correction branch comprising a first and a second switching device which are arranged so as to be in series with one another, and interconnected in the region of the intermediate point;
- the first and/or the second switching device of the correction device comprises at least one power transistor;
- the first switching device of the correction device comprises two power transistors that are arranged so as to be in series with respect to one another, and the second switching device of the correction device comprises two power transistors which are arranged so as to be in series with respect to one another;
- each power transistor of the correction device comprises a freewheeling diode that is placed between a drain terminal and a source terminal of each power transistor;
- each power transistor of the correction device is of the MOSFET (Metal Oxide Semiconductor Field Effect Transistor) type. Alternatively, each power transistor may be of the FET (Field Effect Transistor) type, or an IGBT (Insulated Gate Bipolar Transistor). Preferably, each power transistor is of the p-doped type;
- each first and second switching device of the converter comprises a connection line that is electrically connected to the output line of the converter, the connection line connecting the output line to a common terminal of the two power transistors of the switching device;
- the connection line of each first and second switching device of the converter comprises a diode that is designed so as to prevent the flow of an electric current from the output line towards the corresponding switching device;
- the first and/or the second switching device of each rectification branch of the converter comprises at least one power transistor;
- the first switching device of each rectification branch comprises two power transistors that are arranged so as to be in series with respect to one another, and the second switching device of each rectification branch comprises two power transistors which are arranged so as to be in series with respect to one another;
- each power transistor of each rectification branch comprises a freewheeling diode that is placed between a drain terminal and a source terminal of each power transistor;
- each power transistor of each rectification branch is of the MOSFET (Metal Oxide Semiconductor Field Effect Transistor) type. Alternatively, each power transistor may be of the FET (Field Effect Transistor) type, or an IGBT (Insulated Gate Bipolar Transistor). Preferably, each power transistor is of the p-doped type;
- the correction branch of the device for correcting phase differences between the various electrical phases of the electric network is located in parallel with the rectification branches of the converter. Preferably, in an intermediate situation between the rectification branch of the converter and the voltage branch;
- the converter comprises at least one controller which is designed to (i) control at least one of the switching devices of the rectification branches in order to rectify the corresponding electrical phases of the electric network, and to (ii) control the correction device in order to correct the imbalances between the electrical phases. More particularly, the at least one controller corrects the imbalances between the electrical phases of the electric networks by minimizing or even eliminating the electric current flowing in the correction branch. In order to achieve this, the controller controls the switching devices of the correction branch so as to generate an electric current that is inverse to and of the same amplitude as the electric current flowing in the correction branch, due to the imbalance between the electrical phases of the electric network;
- the converter comprises an inlet filter for each electrical phase and for the electrical reference line, in order to shape corresponding electrical signals;
- the inlet filter of each electrical phase is of an inductive filter type.

According to a second aspect, a bidirectional charger is proposed which comprises a converter according to the first aspect or according to any of the improvements thereof, and at least one active switch double bridge.

According to a first preferred embodiment of the second aspect, the bidirectional charger comprises a single active double bridge which allows for single phase operation: the multiphase, and preferably three-phase, electric network is interfaced by the converter according to the first aspect or according to any of the improvements thereof, in order to compensate for possible electrical phase differences between each electrical phase. An output of the converter thus supplies the single active double bridge in order to generate a single electrical signal transmitted to an electrical system, such as a battery of the electric vehicle on which the bidirectional charger is intended to be mounted.

According to a second preferred embodiment of the second aspect, the bidirectional charger comprises a plurality of active double bridges which allow for multiphase operation: the multiphase electric network is interfaced by the converter according to the first aspect or according to any of the improvements thereof, in order to compensate for possible electrical phase differences between each electrical phase. An output of the converter thus supplies the plurality of active double bridges in order to generate a plurality of electrical signal transmitted to an electrical system, such as a battery of the electric vehicle on which the bidirectional charger is intended to be mounted.

Advantageously, in the second preferred embodiment of the second aspect, the bidirectional charger comprises three active double bridges which are interleaved for the purpose of three phase operation.

Advantageously, the bidirectional charger according to the second aspect may advantageously comprise at least one of the improvements below, it being possible for the technical features forming the improvements to be taken individually or in combination:

- the switches of each active double bridge are of a transistor type, and more preferably of the MOSFET (Metal Oxide Semiconductor Field Effect Transistor) type.

Alternatively, each switch may be of the FET (Field Effect Transistor) type, or an IGBT (Insulated Gate Bipolar Transistor);

the at least one active double bridge comprises an isolation transformer that is located between an inlet and an outlet of said at least one corresponding active double bridge.

Various embodiments of the invention are possible, integrating, according to all the possible combinations thereof, the different optional features disclosed here.

DESCRIPTION OF THE FIGURES

Other features and advantages of the invention will become clear from the following description and various embodiments, given for information purposes and by way of non-limiting example, and with reference to the accompanying drawings, in which.

Of course, the features, the variants, and the different embodiments of the claimed invention may be associated with one another, in accordance with various combinations, insofar as they are not mutually incompatible or exclusive. It is in particular possible to envisage variants of the claimed invention that comprise only a selection of features described in the following, in a manner isolated from the other features described, if this selection of features is sufficient for providing a technical advantage or for distinguishing the invention from the prior art.

In particular, all the variants and all the embodiments described can be combined with one another if there is no technical reason opposing this combination.

In the figures, the elements that are the same in several figures are provided with the same reference sign, and others are adjusted to each configuration.

DETAILED DESCRIPTION

Figures 1, 2:
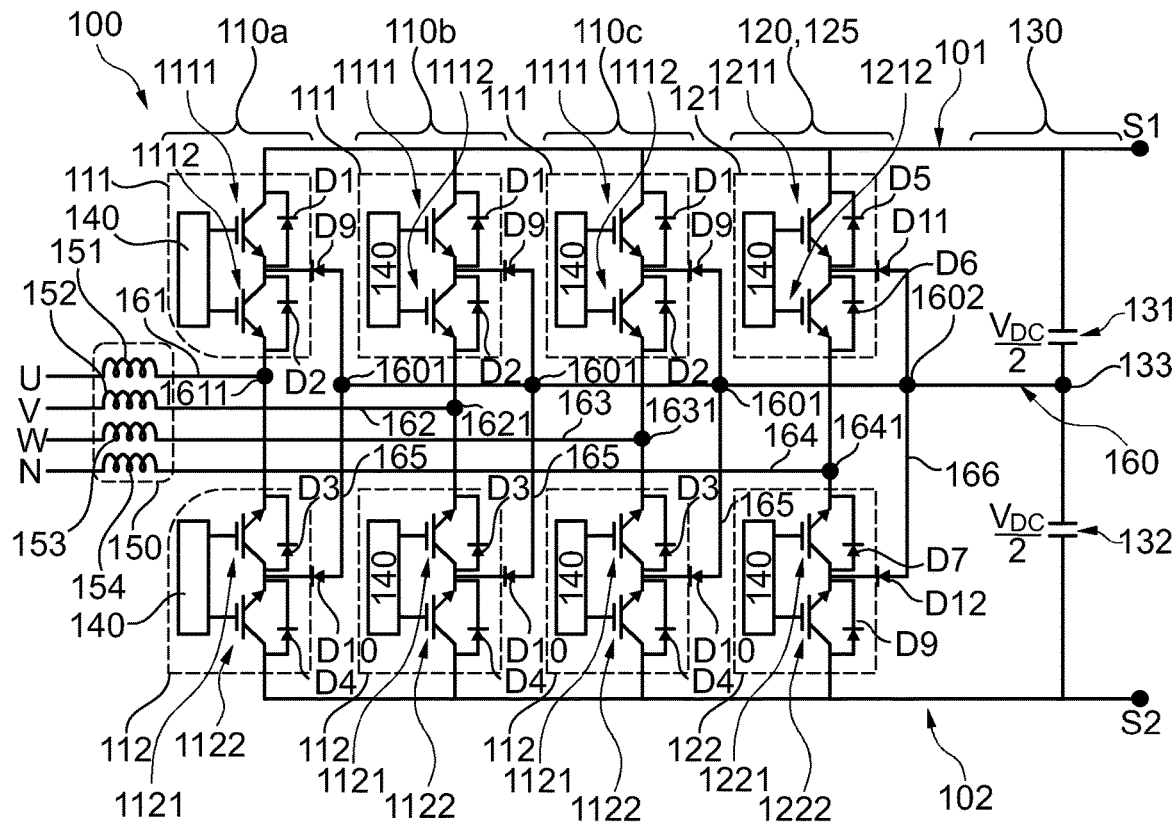
FIG. 1 shows an embodiment of the converter according to the first aspect thereof.
FIG. 2 shows a first embodiment of a bidirectional charger according to the second aspect thereof, designed for single phase operation.

With reference to FIG. 1, an embodiment of the converter 100 according to the first aspect of the invention is shown. The converter 100 shown is designed to be electrically connected to a plurality of electrical phases (U, V, W) of an electric network (not shown), as well as to an electrical reference line (N), referred to in the following as being the neutral.

The converter 100 comprises a plurality of rectification branches 110a-c, and more particularly three rectification branches 110a-c in the example shown in FIG. 1. Each rectification branch 110a-c comprises a rectifier bridge formed by a first switching device 111 and a second switching device 112. The first and the second switching devices 111, 112 are electrically interconnected in the region of a common point (1611, 1621, 1631) that is electrically connected to one of the electrical phases (U, V, W) of the electric network. More particularly, the converter 100 comprises:

a first rectification branch 110a which is electrically coupled to a first electrical phase U in the region of a first common point (1611) located between the first 111 and the second 112 switching device of said first rectification branch 110a;

a second rectification branch 110b which is electrically coupled to a second electrical phase V in the region of a second common point (1621) located between the first 111 and the second 112 switching device of said second rectification branch 110b; and a third rectification branch 110c which is electrically coupled to a third electrical phase W in the region of a third common point (1631) located between the first 111 and the second 112 switching device of said third rectification branch 110c.

Each rectification branch 110a-c is thus electrically connected to a different electrical phase (U, V, W) of the electric network.

All the rectification branches 110a-c are located so as to bypass one another, such that an output terminal of each first switching device 111 is electrically connected to a first electrical output line 101, and an output terminal of each second switching device 112 is electrically connected to a second electrical output line 102.

In addition, the converter 100 also comprises a voltage branch 120 that is positioned so as to bypass all the rectification branches 110. In the example shown in FIG. 1, the voltage branch 120 comprises two output capacitors 131, 132 that are positioned so as to be in series with one another, between the first 101 and the second 102 electrical output line of the converter 100. A midpoint 133 of the two output capacitors 131, 132 is electrically connected to each switching device 111, 112 of each rectification branch 110a-c by means of an output line 160. More particularly, the output line 160 is connected to each rectification branch 110a-c by means of a connection line 165 which electrically connects the first 111 and the second 112 switching device of the corresponding rectification branch 110 to the output line 160, in the region of an electrical node 1601.

Advantageously, the electrical nodes 1601 of the intersections of the connection line 165 of each rectification branch 110a-c with the output line 160 are at the same electrical potentials, or a very close electrical potential.

In the example shown in FIG. 1, the connection line 165 of each rectification branch 110a-c comprises a control diode D9, D10 at each of the ends thereof, in order to prevent the flow of an electric current from the output line 160 in the direction of the switching device 121, 122 of the corresponding rectification branch 110a-c.

According to the first aspect, the converter 100 also comprises a device 125 for correcting phase differences between the various electrical phases U, V, W of the electric network. The correction device 125 is designed to minimize, and preferably to eliminate, an electric current flowing in a neutral N of the electric network.

More particularly, the correction device 125 is formed by a correction branch 120 of the converter 100 and is electrically connected to the neutral N of the electric network, in the region of an intermediate point 1641. The correction branch 120 comprises a first and a second switching device 121, 122 which are arranged so as to be in series with one another, and interconnected in the region of the intermediate point 1641.

In the example shown in FIG. 1, the first and a second switching devices 121, 122 of the correction device 125 comprise two power transistors 1211, 1212, 1221, 1222: the first switching device 121 of the correction device 125 comprises two power transistors 1211, 1212 that are positioned so as to be in series with respect to one another, and the second switching device 122 of the correction device 125 comprises two power transistors 1221, 1222 which are positioned so as to be in series with respect to one another.

Advantageously, each power transistor 1211, 1212, 1221, 1222 of the correction device 125 is of the MOSFET type. Furthermore, each power transistor 1211, 1212, 1221, 1222 of the correction device 125 comprises a freewheeling diode D5, D6, D7, D8 that is placed between a drain terminal and a source terminal of each power transistor 1211, 1212, 1221, 1222 of the correction device 125.

The output line 160 of the converter 100 according to the first aspect of the converter is electrically connected to the rectification branch 120 by means of a line 166 which electrically connects the first and the second switching device 121, 122 of the correction branch 120 to the output line 160, in the region of a second electrical node 1602.

Advantageously, the electrical nodes 1601 of the intersections of the connection line 165 of each rectification branch 110a-c with the output line 160, and the second electrical node 1602 of the intersection of the line 166 with the output line 160 are all at the same electrical potentials, or a very close electrical potential.

In the example shown in FIG. 1, the line 166 comprises a control diode D11, D12 at each of the ends thereof, in order to prevent the flow of an electric current from the output line 160 in the direction of the switching device 121, 122 of the correction branch 120.

In the example shown in FIG. 1, the first and the second switching device 111, 112 of each rectification branch 110a-c of the converter 100 according to the first aspect comprises two power transistors 1111, 1112, 1121, 1122 that are positioned so as to be in series with respect to one another. In particular, the first switching device 111 comprises a first 1111 power transistor and a second power transistor 1112 which are arranged in series with one another by means of a terminal at the same electrical potential of each of said two power transistors 1111, 1112. In an analogous manner, the second switching device 112 comprises a first 1121 and a second 1122 power transistor which are arranged in series with one another by means of a terminal at the same electrical potential of each of said two power transistors 1121, 1122.

Each power transistor 1111, 1112, 1121, 1122 of each rectification branch 110 of the converter 100 according to the first aspect comprises a freewheeling diode D1, D2, D3, D4 that is placed between a drain terminal and a source terminal of said corresponding power transistor 1111, 1112, 1121, 1122.

The converter 100 according to the first aspect also comprises an inlet filter 150 which makes it possible to condition each of the electrical phases U, V, W, and the neutral N of the electric network. For this purpose, the inlet filter 150 advantageously comprises an inductive filter 151, 152, 153, 154 on each of the electrical phases U, V, W and the neutral N of the electric network, it being possible for an inductance value of each inductive filter 151, 152, 153, 154 to be identical or different with respect to at least one other value of the inductive filters 151, 152, 153, 154.

As described above, the converter 100 according to the first aspect makes it possible to detect and regulate the imbalance between the various electrical phases U, V, W of the electric network. For this purpose, the converter 100 makes it possible to convert alternating electrical signals of the electric network, present on each of the electrical phases U, V, W, into a continuous electrical signal that is available between the two output terminals S1, S2 thereof.

The converter 100 according to the first aspect is thus designed to interleave the electrical signals present on each of the electrical phases U, V, W, by virtue of the rectification branches 110, and to thus provide a less rippled electrical output signal.

The better control of the continuous electrical signal delivered at the output thus makes it possible to minimize the capacitances of the output capacitors 131, 132 as a result of the lower bypassing of the output electrical signal. Subsequently, minimizing the capacitance values of the output capacitors 131, 132 makes it possible to reduce the dimensions thereof and the general bulk of the converter according to the first aspect.

In order to control the imbalance between the electrical phases U, V, W of the electric network, the converter 100 detects and/or measures and/or controls the electric current on the neutral N of the electric network, so as to minimize or even eliminate the electric current flowing in the correction branch 120. For this purpose, the converter 100 according to the first aspect thus comprises at least one controller 140 which is designed to control at least one of the switching devices 111, 112 of the rectification branches 110 in order to rectify the corresponding electrical phases U, V, W of the electric network, and to control the correction device 125 in order to correct the imbalances between the electrical phases U, V, W. More particularly, the at least one controller 140 corrects the imbalances between the electrical phases U, V, W of the electric network by minimizing or eliminating the electric current flowing in the correction branch 120. In order to achieve this, the at least one controller 140 controls the switching devices 121, 122 of the correction branch 120 so as to generate an electric current that is opposed to and of the same amplitude as the electric current flowing in the correction branch 120, due to the imbalance between the electrical phases U, V, W of the electric network. By way of non-limiting example, the at least one controller 140 is designed to perform a transformation known as DQN in order to determine the electric current to be generated in the correction branch 120 so as to minimize or eliminate the electric current flowing in the correction branch 120, due to the imbalance between the electrical phases U, V, W of the electric network.

FIG. 2 shows a first embodiment of a bidirectional charger 10 according to the second aspect, designed for single phase operation. In other words, the bidirectional charger 10 shown in FIG. 2 is designed to, alternately, convert a three phase electrical signal originating from the electrical phases U, V, W of an electric network into a continuous electrical signal available on the output terminals S3, S4, which can be used for charging a battery of an electric vehicle for example, or to convert a continuous electrical signal, originating from a battery of an electric vehicle for example, into a three phase electrical signal that can be reinjected on the electric network.

The bidirectional charger 10 shown in FIG. 2 comprises the converter 100 according to the first aspect and as described above, as well as a single active double bridge 200. The active double bridge 200 is electrically connected to the converter 100, between the output terminals S1, S2 thereof.

The active double bridge comprises a plurality of switches 211-214, 221-224. More particularly, each switch 211-214, 221-224 is formed by a power transistor, preferably of the MOSFET type. Optionally, each power transistor of an active double bridge may be of the FET or IGBT type, as described above.

The active double bridge 200 thus comprises a first stage 210 comprising a first branch formed by two first switches 211, 214 and a second branch formed by two second switches 212, 213. The first switches 211, 214 forming the first branch of the active double bridge 200 are arranged in series between the output terminals S1, S2 of the converter 100. In a comparable manner, the second switches 212, 213 forming the second branch of the active double bridge 200 are arranged in series between the output terminals S1, S2 of the converter 100, such that the second switches 212, 213 are, collectively, arranged in parallel with the first switches 211, 214.

The active double bridge 200 of the bidirectional charger 10 shown in FIG. 2 also comprises an isolation transformer 230 that is located between an inlet and an outlet of the active double bridge 200. More particularly, the isolation transformer 230 is electrically connected to each first and second branch of the first stage 210 of the active double bridge 200. As a result, a first electrical terminal of the isolation transformer 230 is electrically connected to a midpoint 216 of the first branch, the midpoint 216 of the first branch being located between the first switches 211, 214. In an analogous manner, a second electrical terminal of the isolation transformer 230 is electrically connected to a midpoint 217 of the second branch, the midpoint 217 of the second branch being located between the second switches 212, 213.

The first and the second terminal of the isolation transformer 230 correspond, respectively, to a first and a second end of a primary electrical winding 232 of said isolation transformer.

In an advantageous manner, the isolation transformer 230 also comprises an inductive filter between the midpoint 216 of the first branch and the first terminal of the primary winding 232 of the isolation transformer 230.

On the side of a secondary winding 233 of the isolation transformer 230, the active double bridge 200 of the bidirectional charger 10 comprises a second stage 220 comprising a first branch formed by two first switches 221, 224 and a second branch formed by two second switches 222, 223. The first switches 221, 224 forming the first branch of the second stage 220 of the active double bridge 200 are arranged in series between the output terminals S3, S4 of the active double bridge 200. In a comparable manner, the second switches 222, 223 forming the second branch of the second stage 220 of the active double bridge 200 are arranged in series between the output terminals S3, S4 of the active double bridge 200, such that the second switches 222, 223 are, collectively, arranged in parallel with said first switches 221, 224.

The secondary winding 233 of the isolation transformer 230 is electrically connected to each first and second branch of the second stage 220 of the active double bridge 200. As a result, a first electrical terminal of the secondary winding 233 of the isolation transformer 230 is electrically connected to a midpoint 226 of the first branch of the second stage 220, the midpoint 226 of the first branch being located between the first switches 221, 224 of the second stage 220. In an analogous manner, a second electrical terminal of the secondary winding 233 of the isolation transformer 230 is electrically connected to a midpoint 227 of the second branch of the second stage 220, the midpoint 227 of the second branch being located between the second switches 222, 223 of the second stage 220.

The active double bridge 200 also comprises a first controller 215 which is designed to control each switch 211-214 of the first stage 210, and a second controller 225 which is designed to control each switch 221-224 of the second stage 220. Optionally, the first and the second controllers 215, 225 are grouped together in a single controller, which may possibly be shared with the controller 140 of the converter 100.

Figure 3:
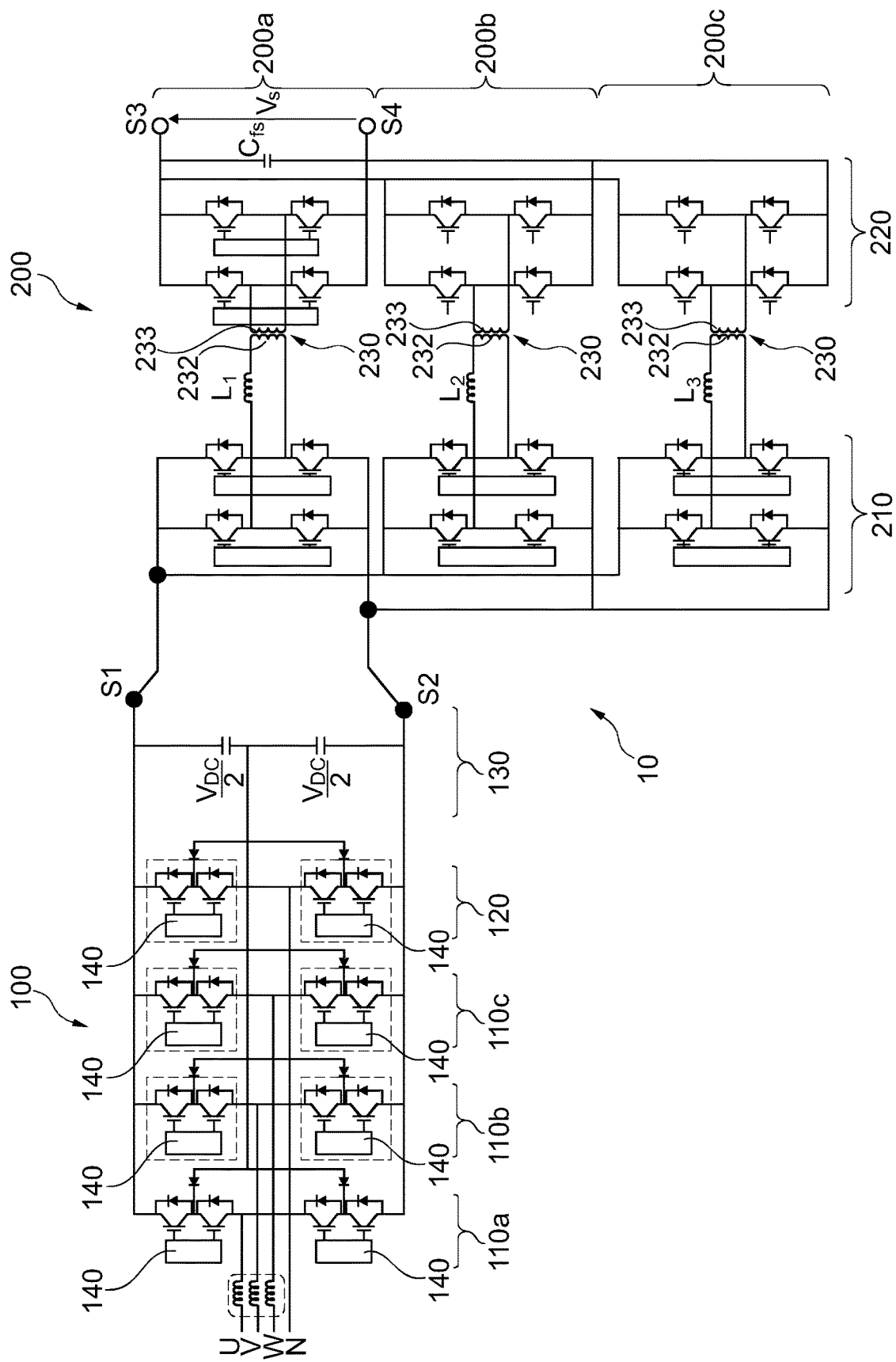
FIG. 3 shows a second embodiment of the bidirectional charger according to the second aspect, designed for three phase operation.

FIG. 3 shows a second embodiment of the bidirectional charger 10 according to the second aspect thereof, designed for three phase operation. In other words, the bidirectional charger 10 shown in FIG. 3 is designed to, alternately, convert a three phase electrical signal originating from the electrical phases U, V, W of an electric network into a continuous electrical signal available on the output terminals S3, S4, which can be used for charging a battery of an electric vehicle for example, or to convert a continuous electrical signal, originating from a battery of an electric vehicle for example, into a three phase electrical signal that can be reinjected on the electric network.

In order to achieve this, the bidirectional charger 10 shown in FIG. 3 comprises the converter 100 according to the first aspect and as described above, as well as three active double bridges 200a, 200b, 200c. Each active double bridge 200 is electrically connected to the converter 100, in the region of the output terminals S1, S2 thereof. More particularly, the three active double bridges 200 of the bidirectional charger 10 shown in FIG. 3 are all arranged so as to bypass one another, such that the switches of the first stage 210 of each active double bridge 200 are polarized between the output terminals S1, S2 of the converter.

The first stages 210 of each active double bridge 200 of the bidirectional charger 10 shown in FIG. 3 are electrically connected to the primary winding 232 of the isolation transformer 230, as described above with reference to FIG. 2; and the second stages 220 of each active double bridge 200 of the bidirectional charger 10 shown in FIG. 3 are electrically connected to the secondary winding 233 of the isolation transformer 230, as described above with reference to FIG. 2.

In summary, the converter 100 comprises a plurality of rectification branches 110a-c that make it possible in particular to rectify alternating electrical signals available on the electrical phases U, V, W of an electric network. In order to balance the electrical signals originating from the electrical phases U, V, W of the electric network, and in order to limit a modulation amplitude of the continuous signal generated by the converter 100 between the output terminals S1, S2 thereof, the converter 100 also comprises a correction branch 120 which determines an amplitude of an electric current flowing in the neutral N of the electric network, and which generates an opposite electric current of the same, or a close, amplitude. Additionally, the bidirectional charger 10 comprising a converter 100 of this kind, as well as one or more active double bridges 200, such that an outputs S3, S4 of the active double bridges 200 are electrically isolated from the converter 100.

Of course, the claimed invention is not limited to the embodiments described above, and a number of developments can be made to the embodiments, without departing from the scope of the claimed invention. In particular, the various features, types, variants, and embodiments of the claimed invention may be associated with one another, in accordance with various combinations, insofar as they are not mutually incompatible or exclusive. In particular, all the variants and embodiments described above can be combined with one another.

The invention claimed is:

1. A converter designed for being electrically connected to a plurality of electrical phases of an electric network, said converter comprising:

a plurality of rectification branches, each rectification branch comprising a rectifier bridge comprising a first switching device and a second switching device, the first and the second switching device being electrically interconnected in a region of a common point that is electrically connected to one of the electrical phases of the electric network, each rectification branch being electrically connected to a different electrical phase;

a voltage branch positioned so as to bypass all the rectification branches, the voltage branch comprising at least two output capacitors that are positioned in series, a midpoint of the two output capacitors being electrically connected to the first switching device and second switching device of each rectification branch by means of an output line; and a correction device for correcting phase differences between the various electrical phases of the electric network, said correction device being designed so as to minimize an electric current flowing in an electrical reference line of the electric network, the electrical reference line of the electric network being an electrical neutral of the electric network; wherein the correction device comprises a correction branch of the converter, said correction branch being electrically connected to the electrical reference line of the electric network in the region of an intermediate point, the correction branch comprising a first switching device and a second switching device which are arranged so as to be in series with one another, and interconnected in the region of the intermediate point.

2. The converter according to claim 1, wherein the first switching device and/or the second switching device of the correction device comprise at least one power transistor.

3. The converter according to claim 2, wherein the first switching device of the correction device comprises two power transistors that are positioned so as to be in series with respect to one another, and the second switching device of the correction device comprises two power transistors which are positioned so as to be in series with respect to one another.

4. The converter according to claim 2, wherein said at least one power transistor of the correction device comprises a freewheeling diode that is placed between a drain terminal and a source terminal of each power transistor.

5. The converter according to claim 2, wherein each of said first and second switching device of the converter comprises a connection line that is electrically connected to the output line of the converter, the connection line connecting said output line to a common terminal of the two power transistors of said switching device.

6. The converter according to claim 5, wherein the connection line of each first and second switching device of the converter comprises a diode that is designed so as to prevent the flow of an electric current from the output line towards the corresponding switching device.

7. The converter according to claim 1, wherein the first and/or the second switching device of each rectification branch of the converter comprises at least one power transistor.

8. The converter according to claim 7, wherein the first switching device of each rectification branch comprises two power transistors positioned so as to be in series with respect to one another, and the second switching device of each rectification branch comprises two power transistors positioned so as to be in series with respect to one another.

9. The converter according to either claim 7, wherein said at least one power transistor of each rectification branch comprises a freewheeling diode positioned between a drain terminal and a source terminal of each power transistor.

10. The converter according to claim 1, wherein the correction branch of the device for correcting phase differences between the various electrical phases of the electric network is located in parallel with the rectification branches of the converter.

11. The converter according to claim 1, wherein the converter comprises an inlet filter for each electrical phase and for the electrical reference line, in order to shape corresponding electrical signals.

12. A bidirectional charger comprising the converter according to claim 1 and at least one active double bridge 200 of switches.

13. The bidirectional charger according to claim 12, wherein the at least one active double bridge comprises an isolation transformer located between an inlet and an outlet of said at least one corresponding active double bridge.

* * * * *